(12) United States Patent
Narayanaswamy

(10) Patent No.: US 6,983,727 B2
(45) Date of Patent: Jan. 10, 2006

(54) CONTINUOUSLY VARIABLE INTAKE MANIFOLD WITH INTELLIGENT POSITION CONTROL

(75) Inventor: Karthikeyan Narayanaswamy, Canton, MI (US)

(73) Assignee: Siemens VDO Automotive Inc., Chatham (CA)

( * ) Notice: Subject to any disclaimer, the term of this patent is extended or adjusted under 35 U.S.C. 154(b) by 298 days.

(21) Appl. No.: 10/336,105

(22) Filed: Jan. 3, 2003

(65) Prior Publication Data

US 2003/0177996 A1 Sep. 25, 2003

Related U.S. Application Data

(60) Provisional application No. 60/365,897, filed on Mar. 19, 2002.

(51) Int. Cl.
  *F02B 27/02* (2006.01)

(52) U.S. Cl. ................................. 123/184.55
(58) Field of Classification Search ............ 123/184.55, 123/184.21, 184.24, 184.42
  See application file for complete search history.

(56) References Cited

U.S. PATENT DOCUMENTS

| | | | |
|---|---|---|---|
| 5,653,202 A | | 8/1997 | Ma |
| 5,687,684 A | | 11/1997 | Verkleeren |
| 5,950,587 A | | 9/1999 | Sattler et al. |
| 6,047,677 A | * | 4/2000 | Kim ................... 123/184.55 |
| 6,161,513 A | | 12/2000 | Lohr et al. |
| 6,209,502 B1 | | 4/2001 | Davis et al. |
| 6,260,528 B1 | | 7/2001 | Pringle et al. |
| 6,314,949 B1 | | 11/2001 | DeGrazia, Jr. et al. |
| 6,408,810 B1 | * | 6/2002 | Leipelt et al. ......... 123/184.55 |
| 6,460,501 B1 | * | 10/2002 | Fischer et al. ......... 123/184.55 |

FOREIGN PATENT DOCUMENTS

| | | | |
|---|---|---|---|
| DE | 297 12 459 U1 | | 10/1997 |
| DE | 196 34 913 A1 | | 3/1998 |
| EP | 0728918 A2 | | 8/1996 |
| EP | 0790394 A2 | | 8/1997 |
| EP | 0790394 A2 | * | 8/1997 |
| JP | 60 079118 A | | 5/1985 |
| JP | 8 338251 A | | 12/1996 |
| JP | 8338251 A | * | 12/1996 |
| JP | 2001 082155 A | | 3/2001 |
| JP | 2001082155 A | * | 3/2001 |

OTHER PUBLICATIONS

Search report, United Kingdom, dated Jul. 4, 2003.

* cited by examiner

*Primary Examiner*—Henry C. Yuen
*Assistant Examiner*—Jason Benton

(57) ABSTRACT

An intake manifold includes a permanent runner which provides airflow communication between a plenum volume and a plurality of engine cylinders. An active runner assembly retracts into and extends from the permanent runner assembly in response to a drive system which communicates with a controller to selectively change the length of the intake manifold assembly to optimize performance. The permanent runner assembly includes a plurality of fixed length passages and the active runner assembly includes a plurality of active runner passages. Each active runner passage telescopes in and out of a respective fixed length passage to vary the effective length between the plenum and the engine cylinder.

15 Claims, 4 Drawing Sheets

CONTINUOUSLY VARIABLE INTAKE MANIFOLD WITH INTELLIGENT POSITION CONTROL

The present application claims priority to U.S. Provisional Patent Application Ser. No. 60/365,897, filed 19 Mar. 2002.

BACKGROUND OF THE INVENTION

The present invention relates to a vehicle intake manifold, and more particularly to an intake manifold having a tube in tube variable design.

An air intake manifold of a multi-cylinder engine is a branched pipe arrangement which connects the valve ports of each cylinder with an air inlet. The manifold may have considerable effect on engine performance. The intermittent or pulsating nature of the airflow through the manifold into each cylinder may develop resonances in the airflow at certain speeds. These may increase the volumetric efficiency and thus, the power at certain engine speeds, but may reduce such efficiency at other speeds, depending on manifold dimensions and shape.

Conventional intake manifolds for vehicles have a fixed air flow geometry. With a fixed intake system, the speed at which intake tuning occurs is also fixed. Since the engine operates over a broad RPM range, and since a different geometry may be ideal for different engine speeds, fixed geometry intake systems are designed with a geometry which is optimal for only a limited range of engine speeds. The intake may be typically designed as a compromise between torque at low speeds and horsepower at high speeds.

Various designs for variable intake geometry and have met with varying degrees of success. Each of these conventional variable intake manifolds may be rather complex and expensive to produce. Difficulty in servicing and a limited range of variable tuning may also be disadvantageous design results of conventional variable intake manifolds.

Accordingly, it is desirable to provide a cost effective variable intake manifold which will operate with different types of engines and yet still maximize the variable tuning available during engine operation.

SUMMARY OF THE INVENTION

The intake manifold assembly according to the present invention includes a permanent runner which communicates airflow between a plenum volume and a plurality of engine cylinders. An active runner assembly retracts into and extends from the permanent runner assembly in response to a drive system which communicates with a controller to selectively change the effective length of the intake manifold assembly. The permanent runner assembly includes a plurality of fixed length passages and the active runner assembly includes a plurality of active runner passages. Each active runner passage telescopes in and out of a respective fixed length passage to vary the effective length between the plenum and the engine cylinder.

In operation at low engine speeds, the active runner passages are rotated fully out of the fixed length passages. This creates the longest length between the plenum and the cylinders which is a preferred tuning for the low engine speeds. As the engine speed increases, the active runner passages are rotated into the fixed length passages until the active runner passages are rotated fully into the fixed length passages such that the shortest airflow length between the plenum and the cylinders is provided.

The present invention therefore provides a cost effective variable intake manifold which operates with various engine types while maximizing the variable tuning available during engine operation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
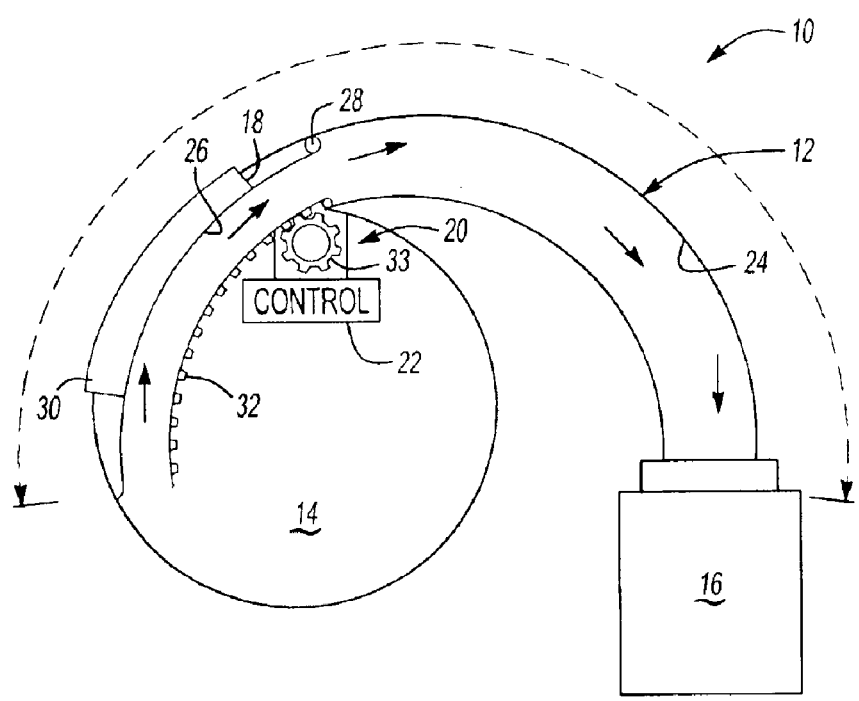
FIG. 1 is a side partially sectional view of the intake manifold assembly in a first position.

FIG. 1 illustrates a general schematic side view of an intake manifold assembly 10. The assembly 10 generally includes a permanent runner assembly 12 which communicates a plenum volume 14 to an engine cylinder (illustrated schematically at 16) as generally known. As generally known, the plenum receives intake airflow from a vehicle intake or the like prior to distribution to a plurality of cylinders. The assembly 10 may include the single manifold assembly 10 supplying intake air to all cylinders as illustrated or may include multiple manifold assemblies which will also benefit from the present invention.

Figure 2:
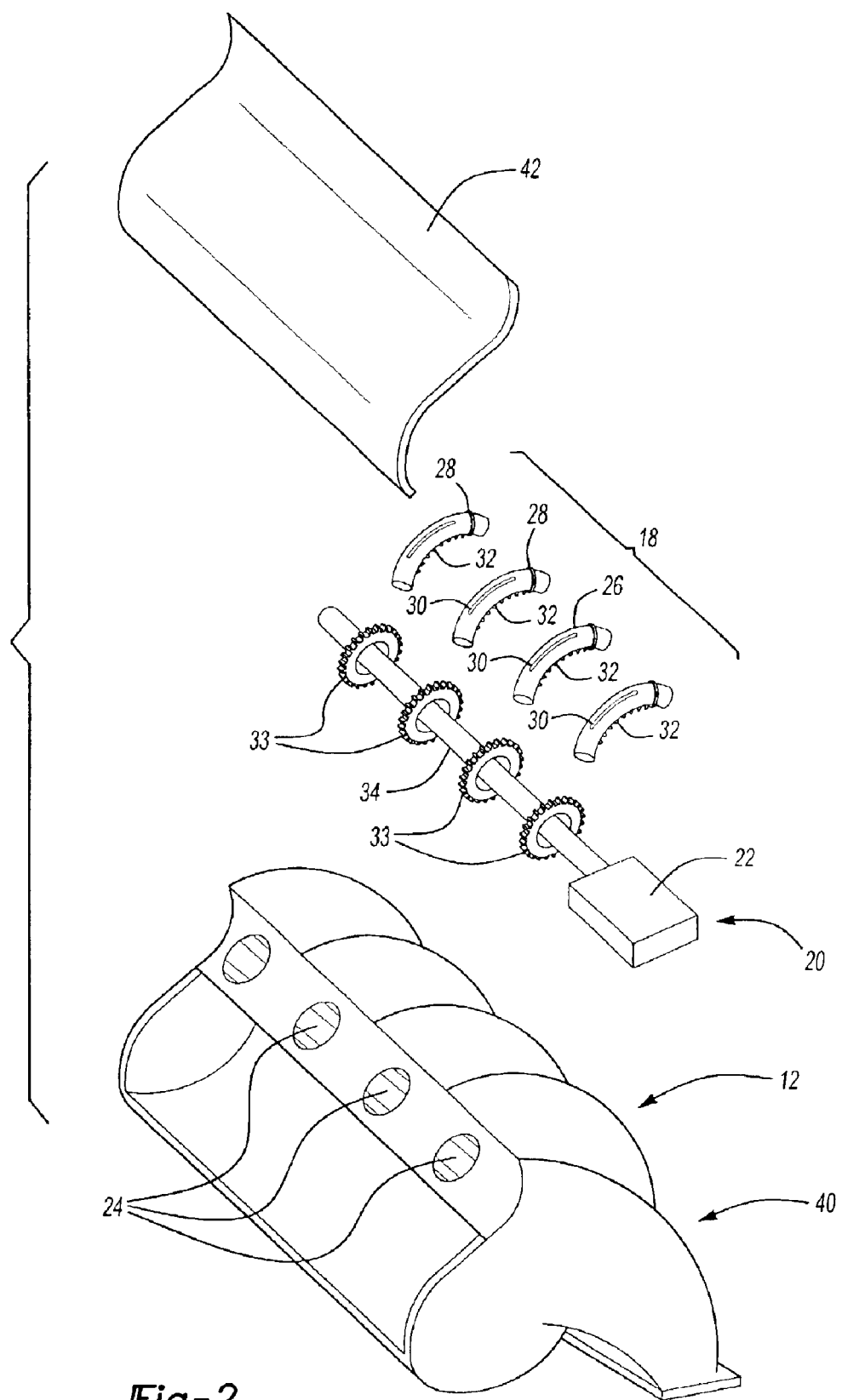
FIG. 2 is a general perspective exploded perspective view of an intake manifold assembly in accordance with the present invention.

An active runner assembly 18 retracts into and extends from the permanent runner assembly 12 in response to a drive system 20. Preferably, the drive system 20 communicates with a controller 22 to selectively change the length of the assembly 10. It should be understood that the controller 22 may be integrated with the drive system 20 or be remotely located. The permanent runner assembly 12 includes a plurality of fixed length passages 24 and the active runner assembly 18 includes a plurality of active runner passages 26 (FIG. 2). Each active runner passage 26 telescopes in and out of a respective fixed length passage 24 to vary the effective runner length between the plenum 14 and the engine cylinder 16. That is, a tube within a tube passageway is formed.

Although the plurality of active runner passages 26 are preferably moved in concert it should be understood that the present invention may additionally or alternatively change the effective length of each active runner passage 26 individually. Each active runner passage 26 includes a seal 28 which assures an air tight engagement between the outer diameter of each active runner passage 26 and the inner diameter of the fixed length passages 24 as each active runner passage 26 moves relative thereto.

An anti-rotation member 30 such as a key and slot arrangement preferably assures that each active runner passage 26 does not rotate within the fixed length passages 24. The anti-rotation member 30 further assures that a set of teeth 32 extending from each active runner passage 26 is maintained in alignment with the drive system 20. That is, engagement of the teeth 32 and drive system 20 preferably provides a rack and pinion type arrangement.

The active runner passages 26 and the fixed length passages 24 need not be of a constant radius. The seal 28 and the anti-rotation member 30 accommodates a clearance between the active runner passages 26 and the fixed length passages 24 which may result clue to a non-constant radius. Alternatively or in addition, the active runner passage 26 is a somewhat flexible member that accommodates the clearance between the active runner passages 26 and the fixed length passages 24 which may result due to a non-constant radius. That is, the flexible active runner passages 26 at least partially conforms to the radius of the fixed length passages 24 during retraction.

Figure 3:
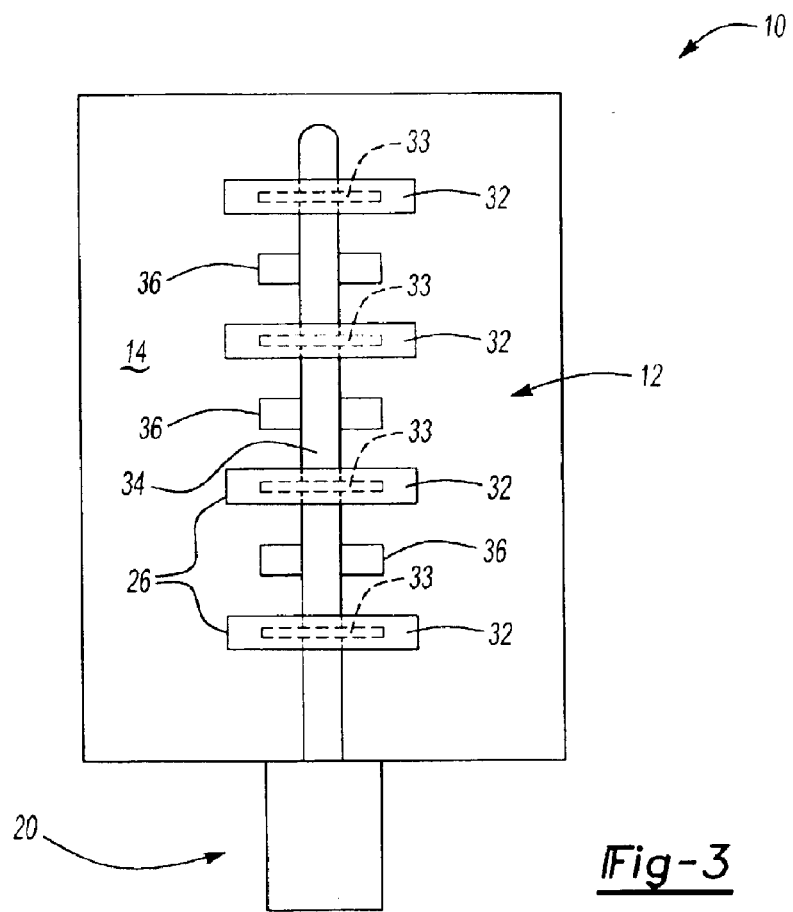
FIG. 3 is a top partially sectional view of the intake manifold assembly.

The drive system 20 includes a pinion gear 33 which engages the gear teeth 32 on the active runner passages 26. A plurality of gears 33 may be located upon a common drive shaft 34 to drive the plurality of active runner passages 26 in concert (FIG. 3). However, the gears 33 may be independently driven through a clutch arrangement 36 (FIG. 3) or the like in response to the controller 22. In this way, variations between cylinders or fuel economy requirements may be met by controlling air flow to individual cylinders 16. It should be understood that various operational requirements will benefit from the present invention.

Figure 4:
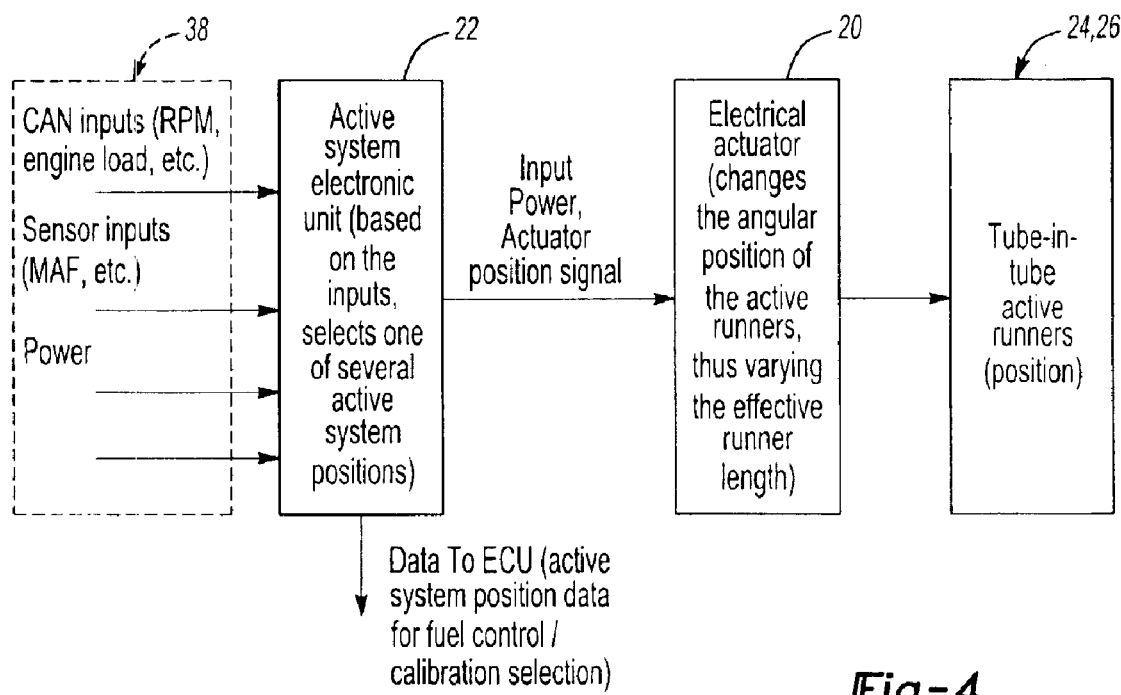
FIG. 4 is a block diagram of the methodology employed by the controller to generate an effective length of a runner manifold of the intake manifold assembly.

FIG. 4 illustrates an operational methodology which drives the controller 22. Generally, inputs 38 are communicated to the controller 22 which communicates with the drive system 20 to vary the effective length of the assembly 10.

Figure 5:
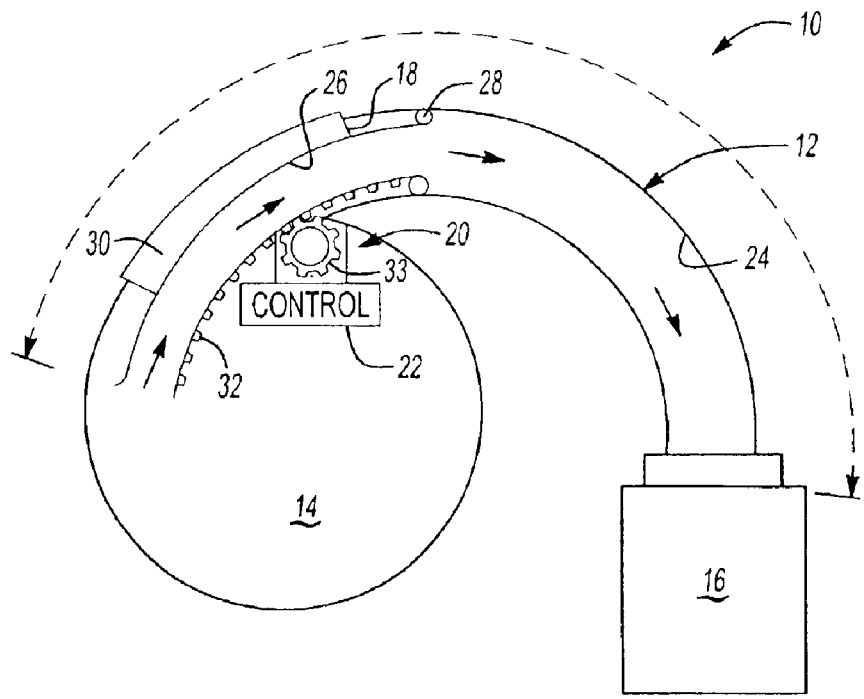
FIG. 5 is a side partially sectional view of the intake manifold assembly in an intermediate position.
Figure 6:
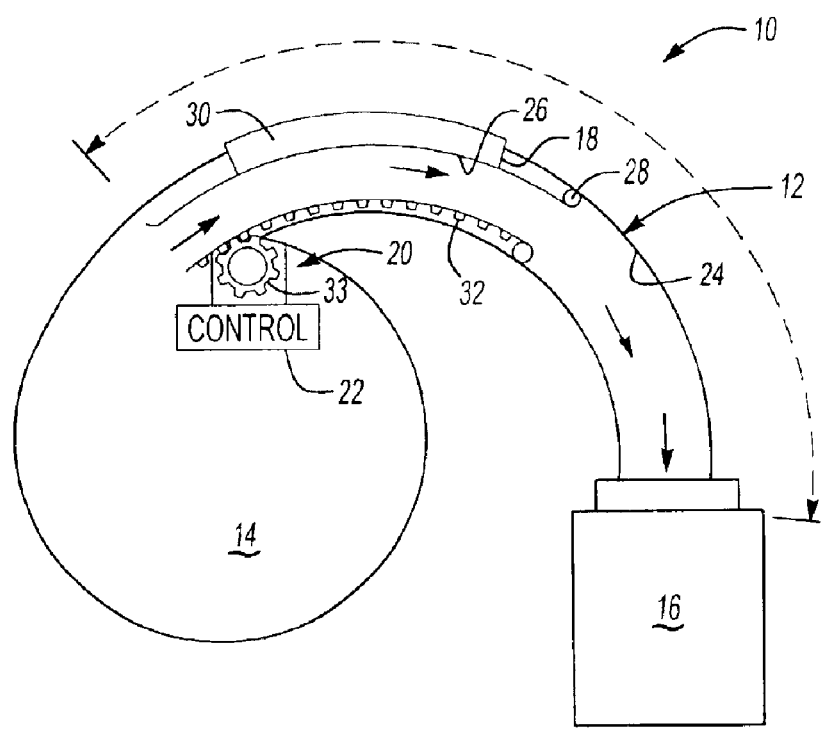
FIG. 6 is a side partially sectional view of the intake manifold assembly in a second position.

In operation, at low engine speeds, the active runner passages 26 are rotated fully out of the fixed length passages 24 (FIG. 1). This creates the longest length between the plenum 14 and the cylinders 16 which is the preferred tuning for the low engine speeds. As the engine speed increases, the active runner passages 26 are rotated into the fixed length passages 24 (FIG. 5) until the active runner passages 26 are rotated fully into the fixed length passages 24 (FIG. 6) such that the shortest length between the plenum 14 and the cylinders 16 for maximum speed operation is provided. Furthermore, when the active runner passages 26 are rotated fully into the fixed length passages 24 (FIG. 6) the effective size of the plenum 14 is increased.

Figure 7:
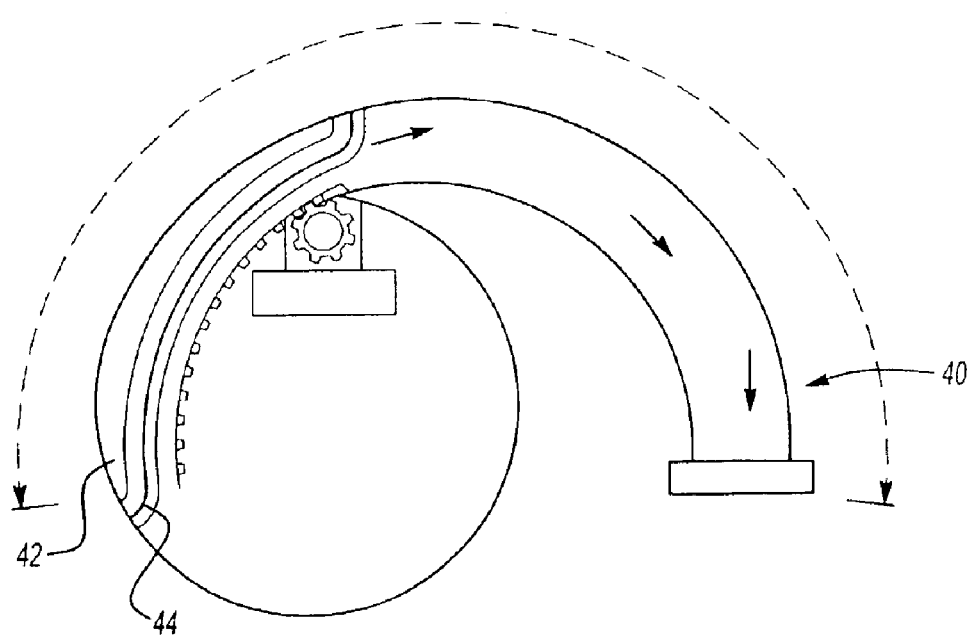
FIG. 7 is a side partially sectional view of the intake manifold assembly.

Referring to FIG. 7, the intake manifold assembly 10 is preferably assembled from a base portion 40 which defines the plurality of fixed length passages 24, the plurality of active runner passages 26 which define the active runner assembly 18 and a cover 42 (FIG. 2). Assembly is relatively uncomplicated as the plurality of active runner passages 26 need only be located within the base portion 40, aligned with the drive system 20 and sealed with the cover 42. Preferably, the parting line 44 between the base portion 40 and the cover 42 defined along the active runner passages 26 when in a fully extended position. That is, the plurality of active runner passages 26 are located within the base portion 40 in an extended position.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle intake manifold assembly comprising:
   a plurality of fixed length passages, each of said plurality of fixed length passages provided communication between a plenum and a cylinder;
   an active runner passage telescopically arranged with each of said plurality of fixed length passages to define a effective runner length, each of said plurality of fixed length passages selectively retractable into said plenum and extendable out of said plenum to adjust an effective size of said plenum;
   a drive system to selectively move each of said plurality of fixed length passages relative each of said plurality of fixed length passages to vary said effective runner length; and
   a base portion which defines said plurality of fixed length passages and a cover which encloses said plurality of active runner passages.

2. The vehicle intake manifold assembly as recited in claim 1, wherein each of said active runner passages comprise a tubular member.

3. The vehicle intake manifold assembly as recited in claim 1, wherein each of said active runner passages comprise a flexible member.

4. The vehicle intake manifold assembly as recited in claim 1, further comprising an anti-rotation member extending from each of said active runner passages.

5. The vehicle intake manifold assembly as recited in claim 4, wherein said anti-rotation member engages one of said plurality of fixed length passages.

6. The vehicle intake manifold assembly as recited in claim 1, wherein said drive system comprises a shaft having a plurality of pinion gears, each of said pinion gears engaged with a set of teeth extending from each of said active runner passages.

7. The vehicle intake manifold assembly as recited in claim 6, further comprising a clutch between each of said plurality of pinion gears such that each of said gears are individually drivable.

8. A vehicle intake manifold assembly comprising:
   a plurality of fixed length passages, each of said plurality of fixed length passages provided communication between a plenum and a cylinder;
   an active runner passage telescopically arranged with each of said plurality of fixed length passages to define a effective runner length;
   a set of teeth extending from each of said plurality of fixed length passages; and
   a drive system comprising a plurality of pinion gears, each of said pinion gears to engage one of said plurality of set of teeth to selectively move each of said plurality of said active runner passages relative each of said plurality of fixed length passages to vary said effective runner length.

9. The vehicle intake manifold assembly as recited in claim 8, wherein each of said active runner passages comprise a tubular member.

10. The vehicle intake manifold assembly as recited in claim 8, wherein each of said active runner passages comprise a flexible member.

11. The vehicle intake manifold assembly as recited in claim 8, further comprising an anti-rotation member extending from each of said active runner passages.

12. A vehicle intake manifold assembly comprising:
a plurality of fixed length passages, each of said plurality of fixed length passages provided communication between a plenum and a cylinder;
an active runner passage telescopically arranged with each of said plurality of fixed length passages to define a effective runner length; and
a drive system to selectively move each of said plurality of fixed length passages relative each of said plurality of fixed length passages to vary said effective runner length, said drive system comprises a pinion gear which engages a set of teeth extending from each of said active runner passages.

13. A vehicle intake manifold assembly comprising:
a plurality of fixed length passages, each of said plurality of fixed length passages provided communication between a plenum and a cylinder;
an active runner passage telescopically arranged with each of said plurality of fixed length passages to define a effective runner length;
a drive system to selectively move each of said plurality of fixed length passages relative each of said plurality of fixed length passages to vary said effective runner length, said drive system comprises a shaft having a plurality of pinion gears, each of said pinion gears engaged with a set of teeth extending from each of said active runner passages; and
a clutch between each of said plurality of pinion gears such that each of said gears are individually drivable.

14. The vehicle intake manifold assembly as recited in claim 1, further comprising a seal mounted to an outer diameter of each of said active runner passages to engage an inner diameter of each of said fixed length passages.

15. A vehicle intake manifold assembly comprising:
a plurality of fixed length passages, each of said plurality of fixed length passages provided communication between a plenum and a cylinder;
an active runner passage telescopically arranged with each of said plurality of fixed length passages to define a effective runner length, each of said plurality of fixed length passages selectively retractable into said plenum and extendable out of said plenum to adjust an effective size of said plenum; and
a drive system to selectively move each of said plurality of fixed length passages relative each of said plurality of fixed length passages to vary said effective runner length, said drive system comprises a shaft having a plurality of pinion gears, each of said pinion gears engaged with a set of teeth extending from each of said active runner passages.

* * * * *